United States Patent
Yan et al.

(10) Patent No.: US 7,334,400 B2
(45) Date of Patent: Feb. 26, 2008

(54) VALVELESS DUAL LEG EXHAUST AFTERTREATMENT SYSTEM

(75) Inventors: Jiyang Yan, Troy, MI (US); James Edward McCarthy, Jr., Canton, MI (US); Haoran Hu, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 104 days.

(21) Appl. No.: 11/223,589

(22) Filed: Sep. 10, 2005

(65) Prior Publication Data
US 2006/0010859 A1 Jan. 19, 2006

Related U.S. Application Data

(63) Continuation-in-part of application No. 10/890,642, filed on Jul. 14, 2004, now Pat. No. 7,213,395.

(51) Int. Cl.
*F01N 3/00* (2006.01)
(52) U.S. Cl. .............. 60/286; 60/287; 60/288; 60/297; 60/301; 48/197 R; 48/198.7; 423/239.1
(58) Field of Classification Search .............. 60/274, 60/285, 286, 287, 288, 292, 295, 297, 301, 60/303, 324; 48/197 R, 198.7; 423/237, 423/239.1, 243.06
See application file for complete search history.

(56) References Cited

U.S. PATENT DOCUMENTS

| | | | |
|---|---|---|---|
| 5,603,216 A | 2/1997 | Guile et al. | |
| 5,974,793 A * | 11/1999 | Kinugasa et al. | 60/285 |
| 6,119,452 A * | 9/2000 | Kinugasa et al. | 60/285 |
| 6,173,568 B1 * | 1/2001 | Zurbig et al. | 60/274 |
| 6,735,940 B2 | 5/2004 | Storia et al. | |
| 6,820,417 B2 | 11/2004 | May et al. | |
| 6,832,473 B2 * | 12/2004 | Kupe et al. | 60/286 |
| 6,955,042 B1 | 10/2005 | Wnuck et al. | |
| 6,959,542 B2 * | 11/2005 | Taylor et al. | 60/295 |
| 7,036,489 B1 * | 5/2006 | Wu et al. | 123/519 |
| 2004/0040287 A1 | 3/2004 | Beutel et al. | |

* cited by examiner

*Primary Examiner*—Binh Q. Tran
(74) *Attorney, Agent, or Firm*—Paul V. Keller

(57) ABSTRACT

An exhaust aftertreatment system comprising two or more branches, at least one of which contains a NOx adsorber-catalyst. The branches unite downstream into a trailing conduit that contains an ammonia-SCR catalyst. Ammonia generated by the NOx adsorber-catalyst during regeneration is stored for later use by the SCR catalyst. One advantage of this configuration is a continuous or near continuous presence of oxygen within the trailing exhaust conduit. The continuous presence of improves the efficiency of the SCR catalyst. Another concept is to configure a multi-branch exhaust aftertreatment system without valves, dampers, or other electronically controlled devices adapted to selectively alter the distribution of the exhaust between the branches. The absence of such devices generally results in a comparatively balanced division of exhaust between the branches. One benefit of this configuration is improved reliability as compared to systems that use valves.

34 Claims, 3 Drawing Sheets

VALVELESS DUAL LEG EXHAUST AFTERTREATMENT SYSTEM

PRIORITY

This application is a continuation-in-part of U.S. patent application Ser. No. 10/890,642, filed Jul. 14, 2004, now U.S. Pat. No. 7,213,395, which is incorporated herein by reference in its entirety.

FIELD OF THE INVENTION

The present invention relates to pollution control devices for diesel engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have already put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches focuses on removing NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Currently, peak NOx conversion efficiencies for lean-burn catalysts are unacceptably low. The introduction of a reductant, such as diesel fuel, into the exhaust is generally required and introduces a fuel economy penalty of 3% or more.

Ammonia-SCR refers to selective catalytic reduction of NOx by ammonia. Often, this is referred to simply as SCR. The reaction takes place even in an oxidizing environment. The NOx can be temporarily stored in an adsorbant or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

LNTs are NOx adsorbers combined with catalysts for NOx reduction. The adsorbant is typically an alkaline earth oxide adsorbant, such as $BaCO_3$ and the catalyst is typically a precious metal, such as Pt or Ru. In lean exhaust, the catalyst speeds oxidizing reactions that lead to NOx adsorption. Accumulated NOx is removed by creating a rich environment within the LNT through the introduction of a reductant. In a rich environment, the catalyst activates reactions by which adsorbed NOx is reduced and desorbed, generally as $N_2$.

A LNT must periodically be regenerated to remove accumulated NOx. This type of regeneration may be referred to as denitration in order to distinguish desulfation, described below. The conditions for denitration can be created in several ways. One approach uses the engine to create a rich fuel-air mixture. For example, a spark ignition can be run rich. A diesel engine can inject extra diesel fuel into the exhaust of one or more cylinders prior to expelling the exhaust. Reductant may also be injected into the exhaust downstream of the engine. Where the engine is run lean, a portion of the reductant is generally expended to consume excess oxygen in the exhaust.

Reductant can consume excess oxygen by either combustion or reforming reactions. Typically, the reactions take place upstream of the LNT over an oxidation catalyst or in a reformer. The reductant can also be oxidized directly in the LNT, but this tends to result in faster thermal aging.

U.S. Pat. Pub. No. 2003/0101713 describes an exhaust system with a fuel reformer placed inline with the exhaust flow upstream of a LNT. The reformer includes both oxidation and reforming catalysts. The reformer both removes excess oxygen and converts diesel fuel reductant into more reactive reformate.

Many publications propose reducing the fuel penalty by providing two or more branches in an exhaust aftertreatment system. During regeneration of a LNT in one branch, all or part of the exhaust flow can be diverted to the other branch. The methods described in these publications require the use of at least one exhaust valve that for a heavy duty truck must generally fit an exhaust pipe with an inner diameter of at least about 10 cm. U.S. Pat. No. 6,820,417 describes a four-way valve for this purpose. U.S. Patent Pub. No. 2004/0139730 describes a valve that divides reductant and exhaust between two LNTs. In a first position, the valve directs reductant to one LNT and exhaust to the other. In a second valve position the flows are switched. The durability and reliability of these valves is not known, although experience with smaller EGR valves suggests durability and reliability will present challenges for these valves.

U.S. Pat. No. 6,735,940 proposes a dual leg system in which the flow is balanced between the two branches except during regeneration. Each branch contains a LNT and an igniter. During regeneration, using a three-way valve, 80% of the flow is directed to one branch while 20% of the flow is directed to the branch being regenerated. Fuel is injected into the branch being regenerated. Part of the fuel is burned by the igniter to eliminate excess oxygen. Reducing the flow during regeneration is said to result in a substantial reduction in fuel penalty. The flows are united downstream and treated by an oxidation catalyst, which is said to virtually eliminate hydrocarbon emissions. U.S. patent Pub. No. 2004/0037755 describes an alternative embodiment wherein one branch contains a LNT and the other branch is a simple bypass.

PCT Pub. No. WO 2004/020807 proposes to avoid the use of valves in a dual leg system by providing two exhaust manifolds, with half the cylinders exhausting into one manifold and the other half into the other. Each manifold channels exhaust into its own exhaust branch and each branch contains a LNT. The exhaust branches unite downstream of the LNTs into a trailing conduit that contains an oxidation catalyst. The LNTs are regenerated alternately and the system is controlled to assure the exhaust in the trailing conduit is always oxygen rich, whereby the oxidation catalyst is continuously active to oxidize hydrocarbons, carbon monoxide, and hydrogen sulfide even without a large oxygen storage capacity.

Hydrogen sulfide can be released by a LNT during desulfation. Desulfation is the process of removing SOx which, like NOx, accumulates in the LNTs. SOx is the combustion product of sulfur present in ordinarily diesel fuel. Even with reduced sulfur fuels, the amount of SOx produced by diesel combustion is significant. SOx adsorbs more strongly than NOx and necessitates a more stringent, though less frequent, regeneration. Desulfation requires elevated temperatures as well as a reducing atmosphere.

A LNT can produce ammonia during denitration. This ammonia can be oxidized, like $H_2S$, however, ammonia can be advantageously captured by a downstream SCR catalyst for subsequent use in reducing NOx, thereby improving NOx conversion efficiency with no increase in fuel penalty or precious metal usage. U.S. Pat. No. 6,732,507 describes a system with an ammonia-SCR catalyst configured downstream of a LNT for this purpose. U.S. Pat. Pub. No. 2004/0076565 describes such systems wherein both components are enclosed by a single shell and/or co-disbursed. PCT Pub. No. WO 2004/090296 describes such a system wherein there is an inline reformer upstream of the NOx adsorber-catalyst and the SCR catalyst.

U.S. Pat. No. 5,727,385 describes a system in which a hydrocarbon-SCR (HC-SCR) catalyst is configured upstream of a LNT. The two components together are said to provide higher NOx conversion than either of the components individually.

U.S. Pat. No. 6,677,264 describes a combined LNT/HC-SCR catalyst. The catalyst comprises two layers on a support. The first layer is a NOx adsorber-catalyst and the second layer is an HC-SCR catalyst having a HC-storing function provided by a zeolite. The HC-storage function is intended to concentrate hydrocarbon reductants in the vicinity of the catalyst and thereby increase activity.

U.S. Pat. No. 6,202,407 describes an HC-SCR catalyst that has a hydrocarbon-storing function. In one embodiment, a diesel fuel reductant supply is pulsed and the catalyst continues to show activity for extended periods between the pulses.

U.S. Pat. No. 5,603,216 describes a branched exhaust system in which one branch contains a hydrocarbon-adsorbing zeolite and the other branch is empty. The two branches unite into a catalytic converter. Secondary air injectors are provided, which are intended to allow selective diversion of the exhaust into the branch containing the zeolite during warm-up. After the zeolite and the catalytic convert have warmed, the secondary air jets are turned off and the exhaust flows through the empty branch.

In spite of advances, there continues to be a long felt need for an affordable and reliable exhaust aftertreatment system that is durable, has a manageable operating cost (including fuel penalty), and can practically be used to reduce NOx emissions across the spectrum of diesel engines to a satisfactory extent in the sense of meeting U.S. Environmental Protection Agency (EPA) regulations effective in 2010 and other such regulations.

SUMMARY

One concept relates to an exhaust aftertreatment system that can be used in a power generation system for a vehicle. The system comprises two or more branches, at least one of which contains a NOx adsorber-catalyst. The branches unite downstream into a trailing conduit that contains an ammonia-SCR catalyst and, optionally, an oxidation catalyst. Ammonia generated by the NOx adsorber-catalyst during regeneration is stored for later use by the ammonia-SCR catalyst. One advantage of this configuration is a continuous or near continuous presence of oxygen within the trailing exhaust conduit. The continuous presence of oxygen improves the efficiency of the ammonia-SCR catalyst, at least in some cases, and can simplify the operation of the clean-up oxidation catalyst.

In one embodiment, two or more branches contain NOx adsorber-catalysts. Preferably, the NOx adsorber-catalysts are regenerated alternately. One advantage of this configuration is that it smoothes variations in the NOx and $NH_3$ supply rates to the trailing conduit. A related advantage is that it reduces the size of the NOx concentration spikes often seen at the start of a regeneration process. Reducing the size of these spikes makes it easier to control the system in a fuel efficient manner while observing an instantaneous NOx emission rate limitation.

Another concept is to configure a multi-branch exhaust aftertreatment system without valves, dampers, or other electronically controlled devices adapted to selectively alter the distribution of the exhaust between the branches. The absence of such devices generally results in a comparatively balanced division of exhaust between the branches. One benefit of this system is improved reliability over prior art systems that use valves. Another benefit is a reduction in peak flow rates that occur during regeneration, whereby catalyst requirements may be reduced. This exhaust aftertreatment system can be used to provide power generation systems and a vehicles to meet strict emission control regulations.

If the benefits of uneven distribution between the branches, e.g., reduced fuel penalty, are felt to outweigh the benefits of comparatively even distribution, the branches can be equipped with temperature actuated (non-selective) dampers. Such dampers can be constructed, for example, with a bi-metal strip. Where the branches contain inline reformers, the bi-metal strips can be placed near the reformers to track the reformer temperatures. As the bimetal strips heat, they bend. The bending is used to close a damper. When the strips cool again, the damper opens. These passive devices are simpler and more reliable than selectively actuated devices.

Another concept is a method of treating lean exhaust. The method comprises channeling the exhaust through a leading conduit and splitting the exhaust from the leading conduit into two or more branches, at least one of which contains a NOx adsorber-catalyst. From time-to-time the NOx adsorber-catalyst is regenerated by injecting reductant into the NOx adsorber-catalyst's corresponding branch. According to the method, the exhaust flow is allowed to divide between the branches according to factors consisting essentially of factors selected from the group consisting of the temperature-dependent friction factors attributable to the fixed geometries of the branches including the devices they contain, the effects of reductant and exhaust flows in the branches, and temperature actuated dampers. As with the system described above, this method provides reliability among other advantages.

A further concept relates to a method of operating a NOx adsorber-catalyst in an exhaust aftertreatment system having two or more branches, each branch containing an inline reformer upstream of a NOx adsorber-catalyst. The two or more branches separate upstream of the reformers and rejoining downstream of the NOx adsorber-catalysts. The method comprises allowing a portion of the exhaust to flow into each branch; adsorbing NOx from the exhaust during a lean phase; injecting a fuel into the exhaust to begin a reformer warming phase; combusting the fuel in the reformer to warm the reformer; increasing the fuel-air ratio to initiate a rich phase; regenerating the NOx adsorber-catalyst; and terminating the fuel flow to begin a new lean phase. Preferably, the average proportion of the exhaust flowing into the branch undergoing regeneration during the rich phase is at least about 50% of the average proportion of the exhaust flowing into that branch during the lean phase. More preferably the percentage is at least 80%. This method also has the benefits of reliability and reduced catalyst requirement. The fuel injection rate can be controlled to minimize the fuel penalty.

The primary purpose of this summary has been to present certain elements of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will become apparent to one of ordinary skill in the art from the following detailed description and annexed drawings. The concepts disclosed herein may be generalized, narrowed, or combined in various ways with the ultimate statement of what the inventors claims as their invention being reserved for the claims that follow.

DETAILED DESCRIPTION

Figure 1:
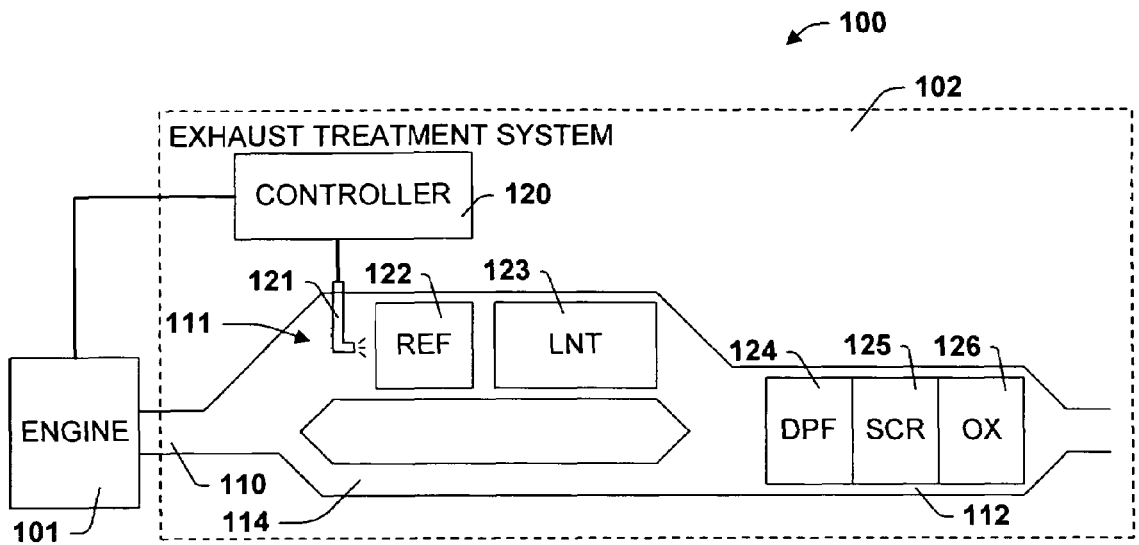
FIG. 1 is a schematic illustration of a first exemplary power generation system.

In the following description and in the attached figures, similar reference numerals are used to identify similar elements throughout.

FIG. 1 is a schematic illustration of an exemplary power generation system 100 comprising an engine 101 and a first exemplary exhaust aftertreatment system 102. The exhaust aftertreatment system 102 comprises a leading exhaust conduit 110, branches 111 and 114, a trailing exhaust conduit 112, and a controller 120. The controller 120 may be an engine control unit (ECU) that controls the engine 101 and the exhaust aftertreatment system 102 or may include two or more control units that collectively perform these functions. The engine 101 is operative to produce exhaust that may drive a turbo-charger and may be tapped for exhaust gas recirculation upstream of the exhaust aftertreatment system 102. The exhaust is channeled by an exhaust manifold (not shown) into the primary exhaust conduit 110.

Within the leading exhaust conduit 110, the exhaust may undergo initial purification. From the leading exhaust conduit 110, the exhaust divides into branches 111 and 114. The branch 111 contains pollution control devices. In this example, the branch 111 contains a fuel injector 121, a reformer 122, and a LNT 123. The branch 114 is a simple bypass. The exhaust from the branches 111 and 114 recombines into the trailing conduit 112. The trailing conduit 112 contains additional pollution control devices, in this example a diesel particulate filter (DPF) 124, an ammonia-SCR catalyst 125, and a clean-up catalyst 126

The exhaust from the engine 101 is normally lean and contains NOx and particulate matter. During normal operation, the fuel injector 121 and the fuel reformer 122 are inactive. The LNT 123 adsorbs a portion of the NOx from the exhaust passing through the branch 111. After the exhaust from the branches 111 and 114 recombines, the DPF 124 removes most of the particulates from the exhaust. The ammonia-SCR catalyst 125 reduces a further portion of the NOx by reaction with ammonia, if ammonia is available. Where ammonia is available, it is generally ammonia stored in the ammonia-SCR catalyst 125 from a previous regeneration of the LNT 123. The clean-up catalyst 126 may serve to oxidize CO and unburned hydrocarbons remaining in the exhaust.

From time-to-time, the LNT 123 is regenerated to remove accumulated NOx. As a first step, the reformer 122 may be heated. Heating the reformer 122 may comprise injecting a small amount of fuel using the fuel injector 121. The fuel burns in the reformer 122. Once the reformer has reached an operating temperature, the fuel-air ratio is increased, whereby the reformer 122 begins to consume excess oxygen and produce reformate. This is continued until the LNT 123 is regenerated to a satisfactory extent.

Regeneration produces several effluents. One effluent may be NOx. Particularly at the beginning of a regeneration, it is sometimes observed that some NOx is released without being reduced. This NOx spike may be reduced if the LNT 123 is configured with little or no oxygen storage capacity. Avoiding temperature increases in the LNT 123 at the beginning of regeneration may also be helpful. In any event, most of the NOx removed from the LNT 123 during regeneration is reduced. Part of the NOx is reduced to $N_2$, part to $NH_3$, and part to $N_2O$, the latter product being least desirable.

During regeneration, as during normal operation, the effluent from the LNT 123 and the effluent from untreated exhaust from the branch 114 combine in the trailing conduit 112. As during normal operation, the DPF 124 removes particulates. If the LNT 123 releases a substantial quantity of NOx, a significant portion of this may be in the form of $NO_2$. An advantage of placing the DPF 124 downstream of the LNT 123 and upstream of the ammonia-SCR catalyst 125, is that this $NO_2$ can be used to combust soot in the DPF 124 prior to that $NO_2$ being reduced by ammonia in the ammonia-SCR catalyst 125. This configuration both serves to assist in regenerating the DPF 124 and in stretching the ammonia stored in the ammonia-SCR catalyst 125.

An alternative configuration places the DPF 124 downstream of the ammonia-SCR catalyst 125. This configuration is appropriate if the DPF 124 includes a catalyst that can chemically convert ammonia. Another advantage of this configuration is that it protects the SCR catalyst 125 from heat generated by combustion of soot in the DPF 124.

Most of the ammonia in the effluent from the LNT 123 is captured by the ammonia-SCR catalyst 125. Under catalytic action, this ammonia reacts with and reduces NOx slipping from the branch 111 and NOx passing through the bypass branch 114 both during and after regeneration of the LNT 123. Preferably, the total ammonia production rate is matched to the NOx rate at the ammonia-SCR catalyst 125, whereby the overall conversion efficiency of NOx by the SCR catalyst 125 is high and ammonia slip from the ammonia-SCR catalyst 125 is low. Generally, the SCR catalyst 125 is at least about 80% efficient in removing NOx and accordingly the time-averaged ammonia generation rate is preferably from about 80 to about 95% of the time-averaged NOx rate at the entrance to the SCR catalyst 125.

The clean-up catalyst 126 oxidizes any unused reductant, slipping ammonia, hydrocarbons, and carbon monoxide contained in the combined flow within the trailing conduit 112. Preferably, there is sufficient oxygen in the combined flow at all times that these tasks can be accomplished without relying on oxygen storage by the clean-up catalyst 126.

An advantage of the exhaust aftertreatment system 102 as compared to a system lacking the bypass branch 114 is that there is a continuous supply of oxygen for the ammonia-SCR catalyst 125 and for the clean-up catalyst 126 through rich and lean cycles of the LNT 123. In general, an ammonia SCR catalyst operates at higher efficiency if oxygen is present. An oxidation catalyst can operate without oxygen by storing oxygen, but only for limited periods of time. The system 102 reduces or eliminates the need for oxygen storage capacity and avoids most concerns over exhausting an oxygen storage capacity. Combustion of soot within the DPF 124 is also facilitated.

From time-to-time, the LNT 123 must be desulfated to remove accumulated SOx. The need or desirability of desulfation can be determined in any suitable fashion. In one example, a NOx sensor downstream of the LNT 123 is used to determine whether the NOx removal rate measured following denitration has fallen below an acceptable limit. In other examples, without limitation, the SOx accumulation is estimated based on miles driven, fuel consumed, or number of denitatrions. When SOx has accumulated to an appropriate degree, a full or partial desulfation is initiated. In general, the time at which to desulfate is determined by the controller 120 and the desulfation process is managed by the controller 120.

Desulfation of the LNT 123 generally involves starting the reformer 122, heating the LNT 123 to a desulfating temperature, and providing the heated LNT 123 with a reducing atmosphere. A typical desulfation temperature is in the range from about 500 to about 800° C., more typically in the range from about 650 to about 750° C. Below the minimum temperature, desulfation is very slow. Above the maximum temperature, the LNT 123 may be damaged. Preferably, the desulfation temperature is at least about 670° C., more preferably at least about 710° C.

Downstream devices may be damaged by desulfation temperatures. In particular, SCR catalysts may be vulnerable. An advantage of the system 100 is that the LNT effluent is cooled by mixing prior to reaching the ammonia-SCR catalyst 125.

Another benefit of the system 100 is that during desulfation the LNT 123 will generally produce ammonia from NOx in the exhaust. The ammonia can be captured by the ammonia-SCR catalyst 125 and used to reduce NOx from the branch 114.

A further benefit of the system 100 is realized when desulfation of the LNT 123 is combined with regeneration of the DPF 124. Both of these operations typically involve heating, but whereas desulfation requires the excess oxygen be removed, DPF regeneration requires oxygen to combust the soot. Combining these processes normally involves heating both the DPF and the LNT, then alternating between lean and rich conditions. The configuration of system 100 allows these operations to be carried out simultaneously. The DPF 124 is heated during desulfation of the LNT 123, although to a lesser temperature than the LNT 123. At the elevated temperature, soot in the DPF 124 can be combusted with oxygen supplied by the branch 114.

A useful feature of the exhaust aftertreatment system 102 is that it operates without relying on any exhaust valves or dampers, which may fail with prolonged use. An exhaust aftertreatment system is preferably designed to operate without maintenance for at least about 700,000 km of driving, more preferably at least 1,000,000 km, still more preferably 1,600,000. Achieving these goals is facilitated by the absence of valves or dampers, and also by reducing the duration and/or frequency of desulfation.

Even without valves or dampers, the system 102 can be regenerated more efficiently than a system without the bypass 114. Because part of the exhaust flow is bypassed, there is less flow through the LNT 123 than there would be through an unbranched system. This increases the residence time during regeneration, making more efficient use of the reductant, and may also reduce the amount of excess oxygen that must be consumed during regeneration.

The exhaust aftertreatment system 102 works best if the LNT 123 reduces a large proportion of adsorbed NOx to $NH_3$ during regeneration. The most important factor in achieving a high selectivity for $NH_3$ appears to be the LNT formulation. The details of optimal catalyst formulation are not well understood, but it is generally believed that ammonia formation can be favored by reducing the LNT's oxygen storage capacity and precious metal loading, particularly loading of Rh. In general, selectivity for ammonia of about 80% or more can be achieved.

Even with a high selectivity for ammonia, most of the exhaust should pass through the LNT 123, as opposed to the bypass 114 in order to achieve a high overall level of NOx mitigation. In the system 102, the amount bypassed is preferably from about 5 to about 45%, more preferably from about 7 to about 30%, still more preferably from about 10 to about 20%. These bypass rates apply when the LNT 123 is at approximately the exhaust temperature and are achieved by appropriately sizing the conduits of the branches 111 and 114.

The foregoing bypass rates will provide a lean composition for the trailing conduit 112 provided the reductant slip rate is not too high. Two ways to limit the reductant slip rate are to limit the reductant supply rate and to regenerate within a regime where reductant usage efficiency is high.

The reductant supply rate can be limited through the fuel injection rate. A first portion of injected fuel consumes excess oxygen by complete combustion according to the stoichiometry:

$$CH_{1.85} + 1.46\ O_2 \rightarrow CO_2 + 0.93\ H_2O \qquad (1)$$

where a 1.85 ratio between carbon and hydrogen in diesel fuel has been assumed. The amount of fuel required to supply reaction (1) can be determined from the exhaust oxygen concentration and flow rate, which are functions of engine operating conditions. An addition amount of fuel is supplied to produce reformate by what is in effect steam reformation:

$$CH_{1.85} + H_2O \rightarrow CO + 1.93\ H_2 \qquad (2)$$

Fuel is consumed first by reaction (1) and then by reaction (2). Thus, excess oxygen can be consumed while the amount of reformate produced can be controlled. Limiting the amount of reformate production is one way of maintaining an excess of oxygen for the trailing conduit 112. Where reformate is consumed efficiently by the LNT 123, the reformate production rate does not need to be limited.

Reformate not consumed by the LNT 123 is preferably oxidized in the trailing conduit 112 according to the following stoichiometry:

$$(CO+1.93\ H_2)+1.46\ O_2 \rightarrow CO_2+1.93\ H_2O \qquad (3)$$

The oxygen required for this reaction is preferably provided through bypass 114, or some conduit other than the branch 111 containing the LNT 123 undergoing regeneration, however, oxygen can also be supplied by an oxygen storage material within the trailing conduit 112.

To the extent reductant slip and providing oxygen to clean up reductant slip are not issues, it is generally desirable to maximize the reformate production rate in order to reduce fuel penalty. The maximum reformate production rate depends on the activity of the catalyst in the reformer 122, the temperature of the reformer 122, and the exhaust oxygen concentration. Reformate production is endothermic. If there is insufficient oxygen in the exhaust to fuel reaction (1), the reformer will rapidly cool. If there is too much oxygen in the exhaust, the reformer (1) will rapidly heat. Either problem can be addressed by pulsing reformate production, with the reformer 122 being cooled or heated in between rich phases. Generally, an oxygen concentration from about 5 to about 10% is preferable for stable reformer operation.

To some extent, the distribution of flow between branches alters during regeneration without any measures being taken. Density decreases in proportion to temperature. Viscosity increases with approximately the half power of temperature. Between these two effects, the resistance to flow of the branch 111 depends on approximately the 1.5 power of absolute temperature. An additional source of flow resistance is the volume added by the injected reductant. These effects combine to increase the fraction of flow diverted to the bypass branch 114 during regeneration.

Generally, the principle flow resistance in a branch 111 is in the LNT 123. During denitration, heating of the LNT 123 is generally avoided, therefore, the redistribution of flow due to temperature is generally observed during desulfation. If redistribution of flow desired for denitration, and to enhance the redistribution of flow in general, the branch 111 can be configured whereby the principle resistance to flow occurs in an area that will consistently heat to near the temperature of the fuel reformer 122, which generally would place the principle resistance to flow upstream of the LNT 123. This can be achieved, for example, by designing the reformer 122 with a comparatively narrow cross-section.

Figure 2:
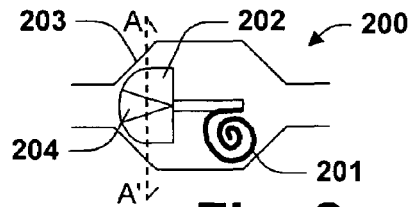
FIG. 2 is a sketch of a temperature actuated damper.
Figure 3:
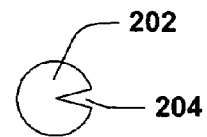
FIG. 3 is a cross-section along line A-A' of FIG. 2 showing a cross-section of the plug for the temperature actuated damper.

Another concept allows an even greater reduction in flow rate in a branch undergoing regeneration without the use of selectively operated valves or dampers. The concept is to use a temperature actuated damper. FIGS. 2 and 3 illustrate such a damper 200, which is passively actuated by the bimetal strip 201. As the bimetal strip 201 heats, the difference in thermal expansion coefficients between the metals causes the plug 202 to approach the mating surface 203. The damper 200 can be designed to achieve any desired reduction in flow during operation of the reformer 122. The damper 200 contains a wedge-shaped gap 204, which is designed to allow a certain amount of flow even when the plug 202 and the mating surface 203 fully engage. After fuel injection ceases, the reformer 122 will cease to produce heat. The reformer 122 and the damper 200 will be cooled by the exhaust. The cooling will eventually cause the damper 200 to reopen. A damper of this type can be placed adjacent, preferably downsteam of, the reformer 122.

Figure 4:
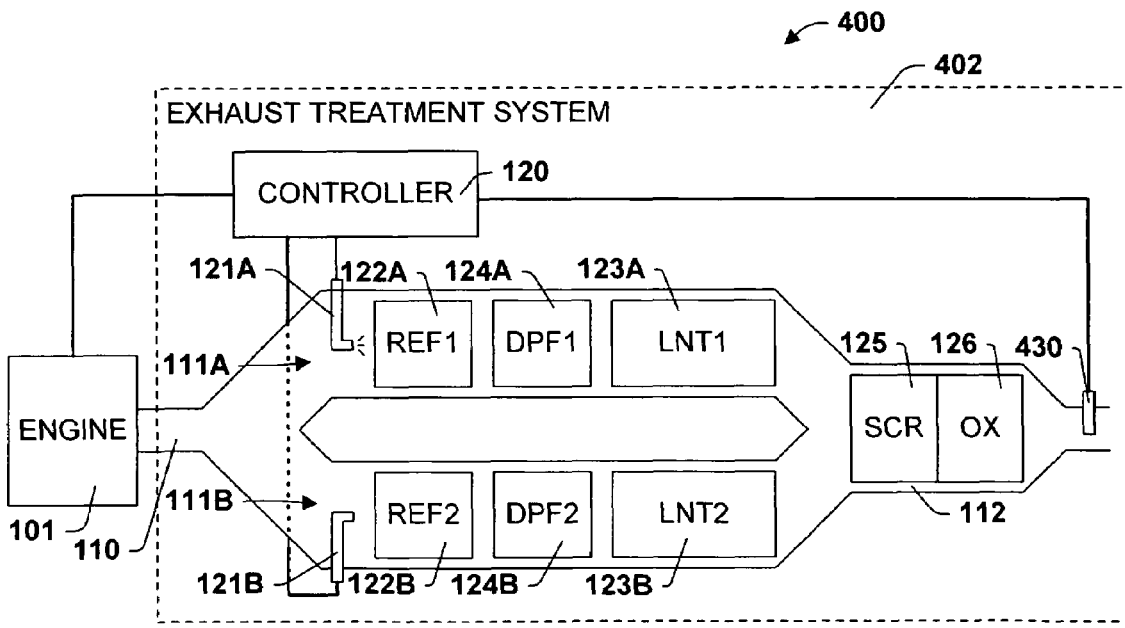
FIG. 4 is a schematic illustration of second exemplary power generation system.

FIG. 4 is a schematic illustration of a power generation system 400 illustrating another concept. The power generation system 400 comprises an exhaust aftertreatment system 402. The exhaust aftertreatment system 402 comprises two branches, 111A and 111B, each containing a fuel injector 121, a fuel reformer 122, a DPF 124, and a LNT 123. The main difference from the exhaust aftertreatment system 102 is that the system 400 contains two or more branches having LNTs 123, and generally lacks a bypass branch. In operation, the LNTs 123A and 123B are preferably regenerated alternately.

An advantage of the exhaust aftertreatment system 402 as compared to a system having a single branch or just one LNT is that variations in the NOx and NH$_3$ production rates from the LNTs 123 are averaged by mixing. NOx spikes at the beginning of regeneration, ammonia production spikes, and peaks in reductant slip are all smoothed by combining the branch flows, provided the branch regeneration cycles are out of phase. This smoothing increases system efficiency. For example, the dual branch system reduces the variations in ammonia concentration in the SCR catalyst 125 over the cycles. A lower variation leads to a higher average conversion efficiency. Control is also simplified.

NOx emission requirements commonly include both total brake-specific NOx limits and instantaneous not-to-exceed limits. In prior art systems, NOx emissions can increase dramatically during regeneration. For example, in some prior art systems having dual LNTs, the entire exhaust flow diverted to one LNT during regeneration. A LNT can be modeled as a plug flow reactor. Assuming first order kinetics, the NOx conversion is given by:

$$f_{NOx} = 1 - e^{\frac{-kV}{F}} \qquad (4)$$

where $f_{NOx}$ is the fractional conversion of NOx, k is a reaction rate constant, V is the LNT volume, and F is the volumetric flow rate through the LNT. When F is increased by flow diversion, the effect can be substantial. According to this equation, if the conversion is normally 85%, doubling the flow rate reduces the conversion to 61%. This creates an issue with emissions during regeneration. Usual ways of addressing this issue include providing enough catalyst in each LNT whereby each LNT can treat the full exhaust flow or providing a large number of branches, whereby only a small fraction of the total LNT volume is undergoing regeneration at any given time. The former approach has the drawback of requiring a large amount of catalyst. The latter approach has the drawback of requiring many complex and potentially unreliable parts.

The system 400 addresses the issue in two ways. First, there is the provision of the SCR catalyst 125 in the trailing conduit 112. If regeneration is appropriately timed, ammonia can be available in the SCR catalyst 125 to mitigate any transient increase in NOx rate. The other way is to design the system 400 with a flow rate distribution that is balanced and substantially unchanged during regeneration. Preferably, the fraction of the exhaust flow entering each branch during its regeneration phase is at least about 50% of what it is during its lean adsorption phase. More preferably at least about 80%.

Regeneration of the LNTs 123 can be controlled independently using, for example, a NOx sensor downstream of each LNT 123 in each branch 111. In such a case, it is preferred that the control system include a check at the start of each regeneration to determine whether the other LNT 123 is being regenerated. If it is, regeneration is preferably postponed until the regeneration of the other LNT 123 is complete, whereby the exhaust conduit 112 can be continuously supplied with oxygen or continuously maintained lean.

More preferably, the regeneration of both LNTs 123 (all, if more than two are used) is controlled by one system. Any suitable system can be used to control the timing and duration of the regenerations. A control scheme can be designed to regenerate the LNTs 123 with such a frequency, in such a manner, and to such an extent as to meet an emission control criteria while minimizing fuel penalty. The emission control criteria could include one or more of a limit on NOx concentration in the treated exhaust and a limited on brake-specific NOx emission rates. The control scheme could also focus on one or more of the conversion efficiencies of the LNTs 123, the efficiency of ammonia production by the LNTs 123 during regeneration, and the efficiency of the ammonia-SCR catalyst 125 under the assumption that if targets for these efficiencies are met, emissions will be adequately controlled. Exemplary control systems include feed forward control systems, feedback control systems based on measurements within the branches 111, feedback control systems based on measurements in the trailing exhaust conduit 112, and hybrids of these methods.

An exemplary control system is based on feedback control using the NOx sensor 430. According to this method, whenever the brake-specific NOx emission rate, as calculated from the NOx concentration measured by the sensor 430 together with other information available to the controller 120, exceeds a predetermined amount, regeneration of one of the LNTs 123 is initiated. Regeneration terminates based on either the detection of ammonia break-through downstream of the SCR catalyst 125 or the detection of excessive reductant breakthrough, for example by a lambda sensor. Ammonia breakthrough can be detected by the sensor 130, since ammonia is oxidized to NOx by the clean-up catalyst 126. If the NOx measurement is increasing late in a regeneration cycle and in a manner that does not correlate with a change in the engine-out exhaust flow rate or composition, then the increase can be attributed to ammonia breakthrough. The NOx sensor 130 can be cross-sensitive to ammonia, as the less expensive NOx sensors generally are.

The foregoing control scheme is conceptually simple, but may have certain disadvantages. One possible disadvantage occurs if there is a large NOx spike at the beginning of each regeneration. The NOx spike could cause a temporary increase in the NOx emission rate and could lead to exceeding a limitation on instantaneous NOx emissions. Specifically, in the simple control scheme regeneration begins when the outlet NOx concentration exceeds a pre-specified value. As the regeneration begins, a NOx spike will occur and tend to cause the NOx concentration to rise even higher, exceeding the pre-specified value that triggered the regeneration. The rise could cause a limit on instantaneous NOx emissions to be exceeded. Avoiding the limit may require a significant degree of over-design. Another possible disadvantage is that the NOx concentration read by the sensor 430 may be misleading due to the effects of sudden changes in the exhaust flow rate, temperature, and composition. Further possible disadvantages are that this method may result in an unnecessarily high regeneration fuel penalty and that the overall NOx conversion may be much higher than required, meaning that the system uses more than the necessary amount of precious metal catalyst.

Figure 5:
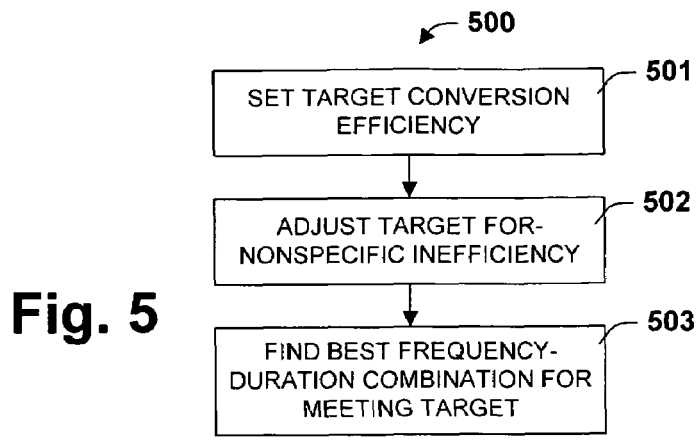
FIG. 5 is a flow chart of a process for determining parameters for a regeneration process.

FIG. 5 illustrates a core process 500 in an exemplary control strategy intended to address some of these issues. The first step 501 is selecting the target conversion efficiency for the exhaust aftertreatment system. The target conversion efficiency is generally fixed, although it could be changed periodically to reflect driving conditions. Some driving conditions produce less brake-specific NOx and/or lower NOx concentrations allowing lower conversion efficiencies to be targeted. Rather than conversion efficiency, a NOx concentration or brake-specific NOx rate can be specified.

The second step 502 adjusts the target conversion efficiency based on feedback control. This step is included to provide a simple way to correct the control system when model-based control used in subsequent steps consistently fails meet emissions targets. The process 500 may receive the target correction factor from another process, which typically selects the correction factor using data collected over a period of time from a NOx sensor, such as the sensor 430.

The third step 503 chooses a set of regeneration parameters that are expected to meet the target conversion efficiency. In this example, there are two regeneration parameters. The parameters are the time between regenerations and the duration of regenerations, or parameters that ultimately determine these times. Additional parameters, such as the reductant supply rate, could also be included, but in this case it is assumed that the reductant supply rate will be controlled by the requirements of operating the reformers 122 to efficiently produce reformate while removing excess oxygen from the exhaust.

Generally, a multiplicity of parameter combinations will be expected to satisfy a given conversion target. A selection among this group can be made on the basis of additional criteria, such as minimizing fuel penalty. The criteria can be codified in terms of minimizing an objective function. The objective function generally relates to fuel penalty, but may also give weight to other criteria.

A model will generally be used to determine the expected conversions. Factors to be taken into account include NOx removal by the LNTs 123, ammonia production by the LNTs 123, and NOx removal by the SCR catalyst 125. NOx removal by the LNTs 123 depends on exhaust flow rate, exhaust NOx concentration, the LNT temperatures, the degree of NOx saturation, and the degree of sulfur poisoning. The exhaust flow rate and NOx concentrations are predicted. Any appropriate predicted values can be used including, for example, current, average, or worst case values. An average or worst case value can be based on an evaluation of the driving state, e.g., one of idling, city driving, highway driving, accelerating, downhill driving, and uphill driving. The temperatures can be estimated based on the exhaust temperature or measured.

NOx saturation of the LNTs 123 will vary over the regeneration cycle in a manner that depends on the regeneration parameters. If exhaust conditions were to remain constant, the NOx saturations would be expected to follow a cyclic pattern, varying between a minimum, which occurs at the beginning of a lean phase, and a maximum, which occurs at the end of a lean phase. The lower the average NOx saturation, the faster and more efficiently the LNTs 123 take up NOx. The higher the average NOx saturation, the more quickly and efficiently the LNTs are regenerated. The average NOx saturation will increase or decrease until it reaches a value at which the rate of NOx accumulation during the lean phases equals the rate of NOx removal during the regeneration phases. This balance can be reflected by an approximation such as:

$$F_{lean}c_{NOx}\int_1^2 e_{NOx}(S_{NOx}(t)) = F_{regen}c_{red}\int_2^3 e_{red}(S_{NOx}(t)) \quad (5)$$

wherein $F_{lean}$ is the estimated average volumetric flow rate of exhaust through a branch during the lean phases, $C_{NOx}$ is the estimated average concentration of NOx in the exhaust, $t_1$ is the start of the lean phase, $t_2$ is the end of the lean phase, $t_3$ is the end of the regeneration phase, $e_{NOx}$ is the efficiency of NOx removal during the lean phase, which depends on $S_{NOx}(t)$, the time-dependent NOx saturation, $F_{regen}$ is the estimated average volumetric flow rate of exhaust through the branch during the regeneration phase, $c_{red}$ is the estimated average concentration of reductant during regeneration, and $e_{red}$ is the efficiency of reductant usage, which also depends on $S_{NOx}(t)$. The difference between $t_1$ and $t_2$ is one parameter. The difference between $t_2$ and $t_3$ is another. With simplifying assumptions, Equation (1) can be used to solve for $S_{NOx}(t)$ as a function of these parameters.

Once $S_{NOx}(t)$ has been determined, the remaining steps in estimating NOx conversion with a given set of parameters are relatively straightforward. Ammonia production, and the release of NOx species during regeneration, can be looked up using a table with experimentally determined entries. For example, a table could be indexed in terms of $S_{NOx}$ at the beginning of regeneration, $S_{NOx}$ at the current point in the regeneration process, and temperature.

The outputs of the two LNTs 123 over a cycle can be summed to give the input to the SCR catalyst 125. The SCR catalyst 125 stores ammonia. The initial ammonia saturation can be determined much as was the NOx saturation of the LNTs: by solving for the initial ammonia saturation that results in a balance between ammonia adsorption and ammonia used in reducing NOx.

Feedback control can be used to refine the model. In particular, a NOx sensor downstream of one of the LNTs 123 in one of the branches 111 can be used to detect declining efficiency. A momentary detection of higher than expected NOx concentration may have a number of explanations, but persistently higher values would be indicative of a decline in efficiency, particularly if factors such as unexpectedly high engine out NOx or exhaust flow rate can be eliminated. Detecting a decline in the efficiency of the LNTs 123 not only improves model accuracy but is useful in desulfation control.

For each set of regeneration parameters searched in step 503, the objective function is evaluated. Generally, this involves determining which parameters give the desired emission control and, for each of those sets of parameters, calculating a fuel penalty. A fuel penalty generally includes a contribution for starting the reformers 122 and removing stored oxygen from the LNTs 123, a contribution for consuming excess oxygen in the exhaust, a contribution for producing reformate that reduces NOx in the LNTs 123, and a contribution for producing reformate that slips past the LNTs 123. Any appropriate method can be used to select which parameters to search. For example, a quasi-Newton method with a steepest descent algorithm could be used.

Using time between regenerations and time of regenerations as the parameters simplified the forgoing discussion, but a disadvantage of these parameter choices is that they do not take into account short term variations in engine operation. Instead of time between regenerations, a total engine out NOx between regenerations is preferably used. The total engine out NOx between regenerations to target can be obtained by multiplying the time between regenerations, as selected by the foregoing method, by $F_{lean}$ and $c_{NOx}$ used in making that selection. Actual engine out NOx can be estimated with sufficient accuracy from the engine 101's operating points.

Instead or regeneration duration, total reductant production is preferably used. The amount to target is again determined from the time as selected by the forgoing method, in this instance multiplied by $F_{regen}$ and $c_{red}$ as used in the calculations. Total reductant production can be determined from data used to manage the reformers 122 and the fuel injectors 121.

Another approach uses a model to track NOx saturation in the LNTs 123 and begins and ends regenerations based on those saturations. Regeneration begins when the estimated saturation equals $S_{NOx}(t_2)$, the saturation determined for the end of the lean phase. Regeneration end when the estimated saturation equals $S_{NOx}(t_3)$, the saturation determined for the end of the rich phase.

Figure 6:
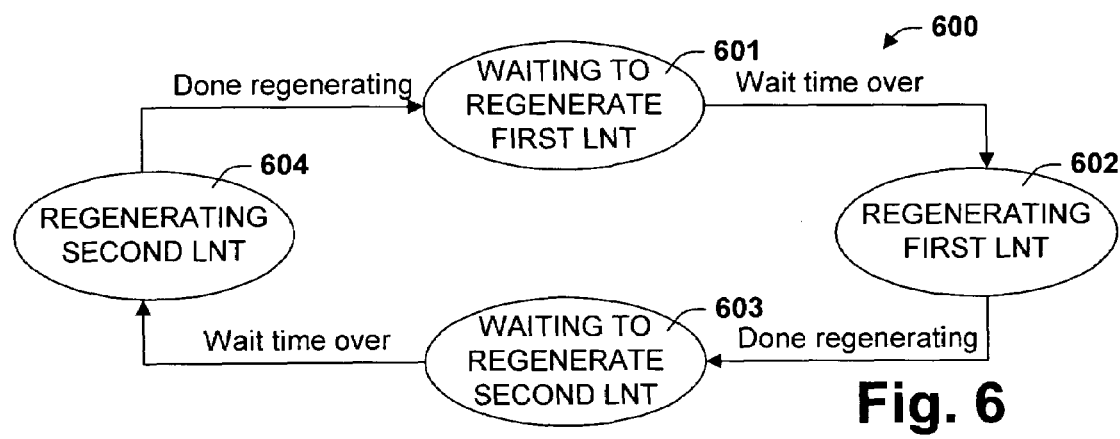
FIG. 6 is a finite state machine diagram of a control process.

FIG. 6 is a finite state machine diagram illustrating a process 600 applying the parameters determined by the method 500. The process 600 begins in state 601, waiting to regenerate the first LNT 123A. When the wait time has elapsed, the process transitions to state 602, the state of regenerating the first LNT 123A. When the regeneration is complete, the process transitions to state 603, waiting to regenerate the second LNT 123B. When the wait time has elapsed, the process transitions to state 604, regenerating the second LNT 123B. When that regeneration is complete, the process returns to state 601.

Regeneration involves starting the reformer 122, consuming excess oxygen in the exhaust, and supplying reformate to the LNT 123. Starting the reformer 122 generally involves heating the reformer 122 to a minimum operational temperature, typically in the range from about 600 to about 700° C. The reformer 122 can be heated by supplying it with diesel fuel at a rate that leaves excess oxygen in the exhaust. When fuel is supplied at such a rate, the fuel is fully combusted producing heat. The fuel is injected by the fuel injector 121. Once the reformer 122 is started, diesel fuel is injected at a rate that provides a rich exhaust composition whereby the reformer 122 operates to consume excess oxygen and produce reformate.

In these examples, the LNTs 123 are regenerated with reformate. Other suitable reductants can be used instead. Examples of suitable reductants include hydrocarbons, such as propane, gasoline, or diesel fuel, oxygenated hydrocarbons, carbon monoxide, hydrogen, ammonia, and ammonia precursors.

Figure 7:
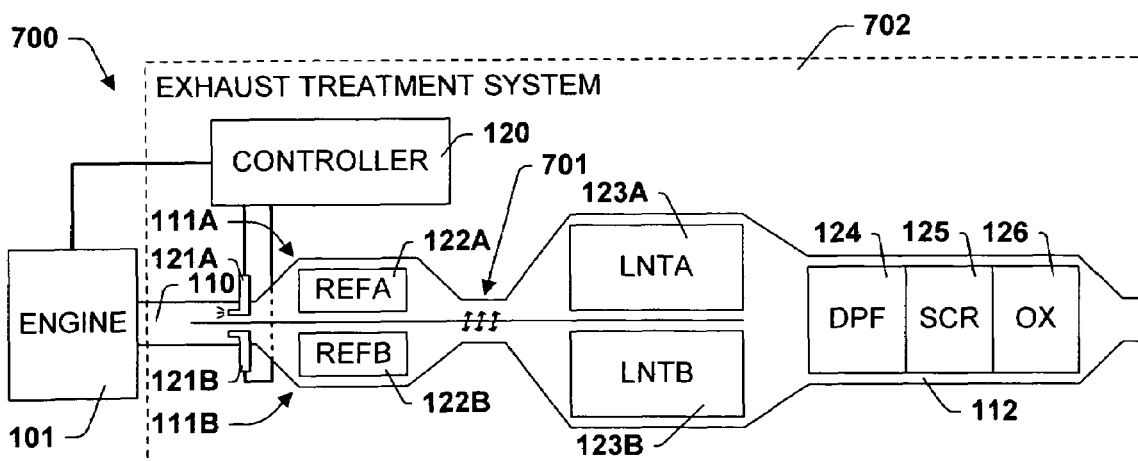
FIG. 7 is a schematic illustration of third exemplary power generation system.

FIG. 7 is a schematic illustration of a power generation system 700 illustrating another concept. The power generation system 700 includes branches 111A and 111B, each containing a fuel injector 121, a reformer 122, and a LNT 123. The two branches are configured to exchange heat at least at the point 701. Heat exchange is facilitated by a large, heat conductive contact area between the two branches, as in a common metal wall. Heat exchange can be further facilitated by additional structures, fins for example.

Heat exchange between the two branches protects the LNTs 123 from high temperatures during regeneration. If the flow divides evenly between the branches, and heat exchange is efficient, the temperature increases experienced by the LNTs 123 during regeneration are halved. Typically, this would involve cooling the exhaust by at least about 100° C. between the reformer 122 and the LNT 123. Reducing the temperatures in this manner can extend the lives of the LNTs 123.

Reducing temperature increases at the beginnings of regenerations may also serve to reduce NOx emissions spikes associated with regenerations. Temperature increases occurring at the beginnings of regenerations are commonly believed to be a cause of these emission spikes. The DPF locations illustrated in FIG. 4 may also be beneficial in this regard, whether of not there is heat transfer between the branches 111.

When high temperatures are desired to desulfate the LNTs 123 in the system 702, the temperatures can be achieved by operating two or more of the reformers 122 simultaneously. Oxygen can be maintained in the trailing conduit 112 by cycling the fuel injection rates to provide alternating lean and rich compositions, with one branch being lean while the other is rich. Optionally, the clean-up catalyst 126 can be provided with oxygen storage capacity, whereby it is not necessary to maintain a continuously supply of oxygen in the trailing conduit 112.

Another option for desulfation is to use a sulfur trap in any suitable location. Examples of suitable locations for sulfur traps include integrated with the reformers 122 and immediately downstream of the reformers 122. The sulfur traps can be heated during ordinary regeneration (denitration) of the LNTs 123, whereby the sulfur traps can be regenerated. Because the sulfur traps are regenerated under rich conditions, the sulfur compounds they desorb are not adsorbed by the LNTs 123. Examples of sulfur compounds that may be desorbed include $SO_2$, $H_2S$, and COS.

Typically, sulfur traps are employed with the idea of eliminating desulfation of the LNTs 123 altogether. This is certainly desirable, where possible, but a further concept is that even a sulfur trap that is less than fully effective can be useful. A sulfur trap may be employed to merely reduce the frequency with which the LNTs 123 need to be regenerated. This will generally extend the lives of the LNTs 123.

A system can also be configured to allow heat transfer between reformers. A disadvantage of such a configuration is that each reformer is more difficult to heat. In fact, it may be necessary to supply both reformers with fuel for heating at the start. An advantage, however, is that in certain situations such heat transfer may facilitate continuously operating the reformers without concern for overheating.

Figure 8:
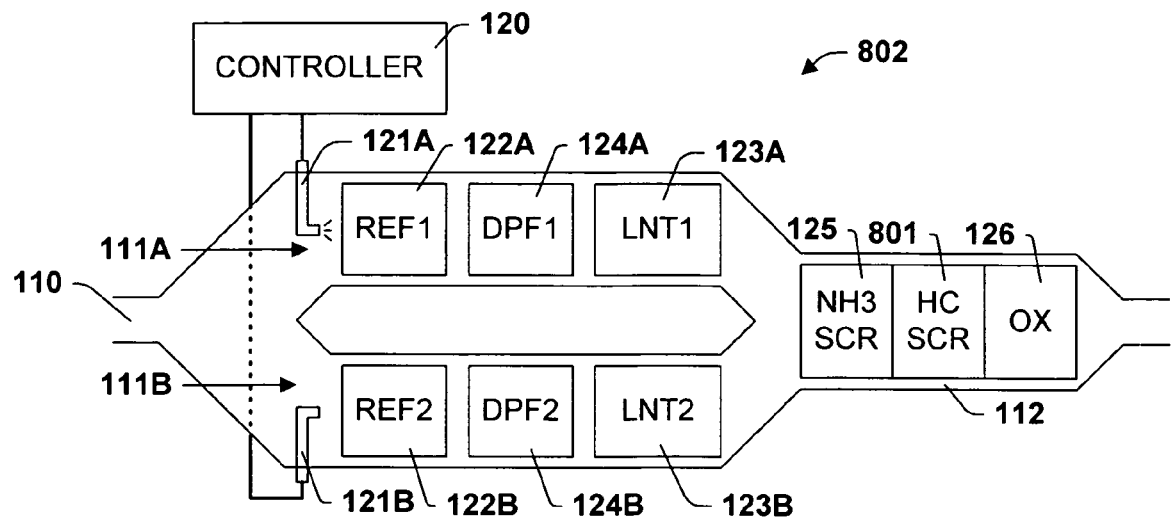
FIG. 8 is a schematic illustration of fourth exemplary exhaust aftertreatment system.

FIG. 8 is a schematic illustration of an exhaust aftertreatment system 802 illustrating a further concept. This concept involves placing a second SCR catalyst 801 in the trailing conduit 112. The second SCR catalyst 801 can be a carbon monoxide-SCR catalyst, a hydrogen-SCR catalyst, or a hydrocarbon-SCR catalyst.

Exhaust aftertreatments systems disclosed herein can achieve high NOx conversions without the second SCR-catalyst 801. The value of this catalyst is in reducing the burden on the LNTs 123. By removing some of the NOx, the second SCR-catalyst 801 reduces the frequency with which the LNTs 123 need to be denitrated and/or desulfated in order to meet emission requirements. This will extend the life of the LNTs 123 and facilitate meeting durability requirements. The second SCR catalyst 801 can use reductant normally present in the exhaust and/or reductant that slips from the LNTs 123 during regeneration.

In one embodiment, the second SCR catalyst 801 has a storage capacity for a slipping reductant. For example, if the SCR catalyst 801 is a hydrocarbon-SCR catalyst, the second SCR catalyst 801 can have a storage capacity for hydrocarbon. Optionally, the fuel injectors 121 can be operated during regeneration to assure there is a substantial hydrocarbon slip. The slipping hydrocarbons are stored in the second SCR catalyst 801 and are used to reduce NOx after regeneration has completed.

Figure 9:
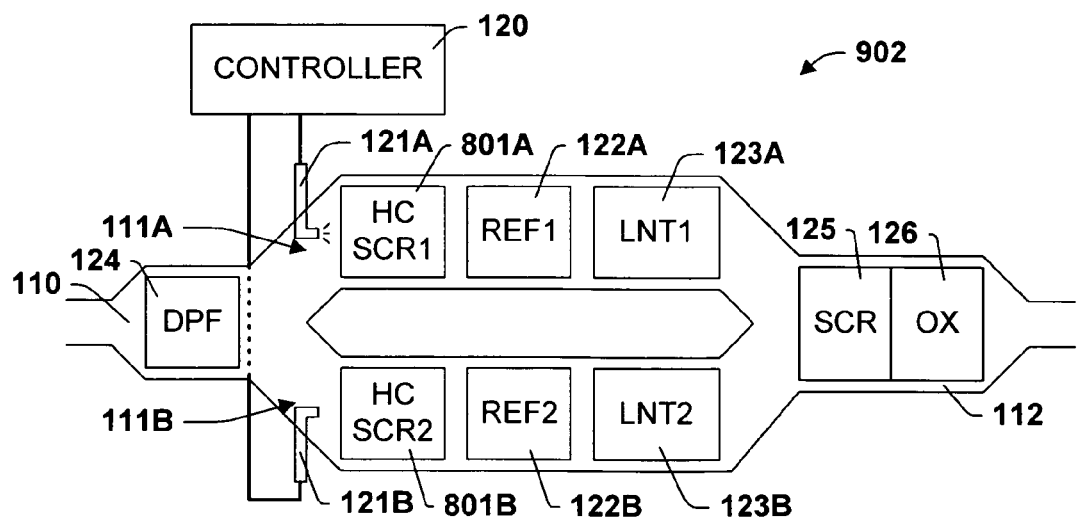
FIG. 9 is a schematic illustration of fifth exemplary exhaust aftertreatment system.

FIG. 9 is a schematic illustration of an exhaust aftertreatment system 902 illustrating a related concept. In this example, second SCR catalysts 801A and 801B, which are illustrated as hydrocarbon-SCR catalysts, are configured in each of the branches 111. A preferred location for these catalysts is between the fuel injectors 121 and the reformers 122. When the second SCR catalysts 801 are hydrocarbon-SCR catalysts and the catalysts are provided with hydrocarbon-storing capacity, this configuration assures an ample supply of hydrocarbons to fill that storage capacity and a high rate of activity for these catalysts both during and after regeneration.

The exhaust aftertreatment system 902 shows another possible location for the DPF 124. In this example, the DPF 124 is placed in the leading conduit 110. This position is particularly desirable if the DPF 124 is regenerated continuously by $NO_2$. Accordingly, the DPF 124 can be catalyzed or non-catalyzed, but a catalyst for oxidizing NO to $NO_2$ is preferably configured upstream of the DPF 124 in this configuration if the DPF 124 does not have a catalyst that performs this function. $NO_x$ concentrations are highest in the leading exhaust conduit 110 (except possibly for spikes occurring downstream as a result of regenerations). High NOx concentrations in the DPF 124 not only facilitate continuous regeneration of the DPF 124, but also maximize the extent to which the DPF 124 contributes to NOx reduction. The second SCR catalyst 801 can also be included in the leading conduit 110 for similar reasons.

US EPA 2007 standards will limit engine NOx production to 1.2 g/bhp-hr over emissions test cycles. US EPA 2010 standards will limit tailpipe NOx emissions to 0.2 g/bhp-hr over the test cycles. An exhaust aftertreatment system with an average NOx conversion of 83% could adapt a vehicle with an engine meeting the US EPA 2007 standard to satisfy the US EPA 2010 standard for NOx tailpipe emissions. Allowing a 15% margin, a typical NOx conversion target is 87%.

The second SCR catalyst 801 can allow an exhaust aftertreatment system to meet a conversion target even when the LNTs 123 are extensively poisoned. In one embodiment, an exhaust aftertreatment system with a second SCR catalyst is overdesigned to meet a conversion target when the LNTs 123 are sulfur-poisoned to 50% of their original efficiency, e.g., twice the NOx break-through rate at full efficiency. In another embodiment, the system is overdesigned to meet the conversion target when the LNTs 123 are sulfur-poisoned to 40% of their original efficiency. In a further embodiment, the system meets the target when the LNTs 123 are sulfur-poisoned to 30% of their original efficiency. Allowing extensive sulfur poisoning between desulfation reduces the frequency and/or duration of desulfations. Desulfations are faster when sulfur concentrations are higher.

Desulfation temperatures are generally obtained by operation of the reformer 122. It may not be possible to operate the reformer 122 continuously through the duration of a regeneration cycle without overheating the reformer 122 or the LNT 123. In such a case, the fuel supply to the reformer 122 can be pulsed. Pulsing allows devices to cool between fuel pulses.

Various examples have been illustrated with two branches. Third, fourth, and additional branches can be added and used in accordance with the principles described herein. Additional branches can be branches containing LNTs, branches containing other exhaust aftertreatment devices, and/or simple bypass branches.

The second SCR catalyst 801 can be either an HC-SCR catalyst, a CO-SCR catalyst, or a $H_2$-SCR catalyst. Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides are alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Examples of CO-SCR catalysts include precious metals on refractory oxide supports. Specific examples include Rh on a $CeO_2$—$ZrO_2$ support and Cu and/or Fe on a $ZrO_2$ support.

Examples of $H_2$-SCR catalysts also include precious metals on refractory oxide supports. Specific examples include Pt supported on mixed $LaMnO_3$, $CeO_2$, and $MnO_2$, Pt supported on mixed $ZiO_2$ and $TiO_2$, Ru supported on MgO, and Ru supported on $Al_2O_3$.

The engine 101 is an internal combustion engine, such as a compression ignition diesel engine. The various concepts of the invention are applicable to power generation systems with lean-burn gasoline engines and other type of systems that produces an oxygen rich, NOx-containing exhaust. For purposes of the present disclosure, NOx consists of NO and $NO_2$.

The fuel injectors 121 can be of any suitable type. They can inject the fuel co-current, cross-current, or counter-current to the exhaust flow. Preferably, they provide the fuel in an atomized or vaporized spray. The fuel may be injected at the pressure provided by a fuel pump for the engine 101. Preferably, however, the fuel passes through a pressure intensifier operating on hydraulic principles to at least double the fuel pressure from that provided by the fuel pump to provide the fuel at a pressure of at least about 4 bar.

A fuel reformer is a device that converts heavier fuels into lighter compounds without fully combusting the fuel. A fuel reformer can be a catalytic reformer, a steam reformer, an autothermal reformer, or a plasma reformer. Preferably, the reformers 122 are partial oxidation catalytic reformers. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 600 to about 1100° C.

The NOx adsorber-catalyst 123 (LNTs) can comprise any suitable NOx-adsorbing material. Examples of NOx adsorbing materials include oxides, carbonates, and hydroxides of alkaline earth metals such as Mg, Ca, Sr, and Be or alkali metals such as K or Ce. Further examples of NOx-adsorbing materials include molecular sieves, such as zeolites, alumina, and silica. Still further examples include metal phosphates, such as phosphates of titanium and zirconium. Generally, the NOx-adsorbing material is an alkaline earth oxide. The adsorbant is typically combined with a binder and either formed into a self-supporting structure or applied as a coating over an inert substrate.

The LNTs 123 also comprise catalysts for the reduction of NOx in a reducing environment. The catalyst can be, for example, a precious metals (such as Au, Ag, and Cu), a group VIII metals (such as Pt, Pd, Ru, Ni, and Co), Cr, Mo, K, or a combination thereof. A typical catalyst includes Pt and Rh, although it may be desirable to reduce or eliminate the Rh to favor the production of $NH_3$ over $N_2$. Precious metal catalysts also facilitate the adsorbant function of alkaline earth oxide adsorbers. Typical effective operating temperatures for a LNT are in the range from about 200 to about 550° C., with many LNTs having a narrower effective operating ranges such as 300 to 450° C.

Adsorbant and catalysts according to the present invention are generally adapted for use in vehicle exhaust systems. Vehicle exhaust systems create restriction on weight, dimensions, and durability. For example, a NOx adsorbant bed for a vehicle exhaust systems must be reasonably resistant to degradation under the vibrations encountered during vehicle operation.

An adsorbant bed or catalyst brick can have any suitable structure. Examples of suitable structures may include monoliths, packed beds, and layered screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The ammonia-SCR catalyst 125 is a catalyst effective to catalyze reactions between NOx and $NH_3$ to reduce NOx to $N_2$ in lean exhaust. Examples of ammonia-SCR catalysts include oxides of metals such as Cu, Zn, V, Cr, Al, Ti, Mn, Co, Fe, Ni, Pd, Pt, Rh, Rd, Mo, W, and Ce, zeolites, such as Y zeolites, Mordenite, ZSM-5, or ZSM-11, substituted with metal ions such as cations of Cu, Co, Ag, Zn, or Pt, and activated carbon.

The particulate filter 124 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less. Optionally, one or more of the LNT 123, the second SCR catalyst 801, or the ammonia SCR catalyst 125 is integrated as a coating on the DPF 13.

The DPF 124 is regenerated to remove accumulated soot. The DPF 124 can be of the type that is regenerated continuously or intermittently. For intermittent regeneration, the DFP 124 is heated, using a reformer 122 for example. The DPF 124 is heated to a temperature at which accumulated soot combusts with $O_2$. This temperature can be lowered by providing the DPF 124 with a suitable catalyst. After the DPF 124 is heated, soot is combusted in an oxygen rich environment.

For continuous regeneration, the DPF 124 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, and Nd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 124 is suitably placed upstream of the reformers 122 as illustrated in FIG. 9.

The clean-up catalyst 126 can be a general oxidation catalyst or one or more selective oxidation catalysts designed to oxidize one or more of unburned hydrocarbons from the engine 101, unused reductants, slipping ammonia, and any $H_2S$ released from the NOx adsorber-catalysts 123 and not oxidized by the SCR catalyst 125. Any suitable oxidation catalysts can be used. A typical oxidation catalyst is a precious metal, such as platinum, palladium, or rhodium. To allow the clean-up catalyst 127 to function under rich conditions, the catalyst may include an oxygen-storing component. Examples of oxygen-storing components include $CeO_2$, NiO, and FeO or mixtures thereof. $ZrO_2$ can improve the thermal stability of an oxygen-storing component. $La_2O_3$ can increase the oxygen storage capacity. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, embodiment, or example described herein.

The claims are:

1. An exhaust aftertreatment system, comprising:
   two or more exhaust conduit branches configured to receive separate portions of the exhaust;
   a NOx adsorber-catalyst within at least one of the two or more exhaust conduit branches;
   a trailing exhaust conduit configured to receive the exhaust from the two or more exhaust conduit branches;
   an ammonia-SCR catalyst within the trailing exhaust conduit; and
   a leading exhaust conduit through which the exhaust passes prior to entering the two or more exhaust conduit branches;
   wherein the system is configured without valves or dampers adapted to selectively alter the division of the exhaust flow from the leading conduit between the two or more exhaust conduit branches.

2. The exhaust aftertreatment system of claim 1, further comprising a diesel particulate filter configured within the trailing exhaust conduit.

3. The exhaust aftertreatment system of claim 2, wherein the diesel particulate filter is configured upstream of the ammonia-SCR catalyst.

4. The exhaust aftertreatment system of claim 1, wherein:
   the system is configured to operate the NOx adsorber-catalyst in lean adsorption and rich regeneration phases; and
   the system is configured whereby the fraction of the exhaust that will enter the branch containing the NOx adsorber-catalyst while that branch is in it rich regeneration phase is at least about 50% of the fraction of the exhaust that will enter that branch while that branch is in it lean adsorption phase.

5. The exhaust aftertreatment system of claim 4, wherein the system is configured whereby the fraction of the exhaust entering the branch containing the NOx adsorber-catalyst while that branch is in it rich regeneration phase will be at least about 80% of the fraction of the exhaust that will enter that branch while that branch is in its lean adsorption phase.

6. The exhaust aftertreatment system of claim 1, further comprising a fuel reformer configured upstream of the NOx adsorber-catalyst and within the branch containing the NOx adsorber-catalyst.

7. The exhaust aftertreatment system of claim 6, wherein a second of the branches contains a fuel reformer and a NOx adsorber-catalyst, the fuel reformer being configure upstream of the NOx adsorber-catalyst.

8. The exhaust aftertreatment system of claim 7, wherein the branches containing fuel reformers are configured with structures to facilitate heat transfer between them.

9. The exhaust aftertreatment system of claim 7, wherein the system is configured to provide substantially higher inter-branch heat transfer coefficients on a per unit passage length basis at a point downstream of where the fuel reformers are located as compared to a point at which the fuel reformers are located.

10. The exhaust aftertreatment system of claim 7, further comprising a sulfur trap within each branch, the sulfur traps being positioned upstream of the NOx adsorber-catalysts.

11. The exhaust aftertreatment system of claim 10, wherein the sulfur traps are positioned downstream of the, reformers.

12. The exhaust aftertreatment system of claim 7, further comprising a particulate filter within each branch.

13. The exhaust aftertreatment system of claim 12, wherein the particulate filters are located between the reformers and the NOx adsorber-catalysts.

14. The exhaust aftertreatment system of claim 1, further comprising a fuel reformer configured upstream of the NOx adsorber-catalyst and within the branch containing the NOx adsorber-catalyst.

15. The exhaust aftertreatment system of claim 14, wherein the branch containing the NOx-adsorber catalyst is configured to provide more flow resistance upstream of the NOx adsorber-catalyst than in its remaining portion, which includes the NOx adsorber-catalyst.

16. The exhaust aftertreatment system of claim 14, wherein the branch containing the NOx-adsorber catalyst is configured with a temperature actuated damper.

17. The exhaust aftertreatment system of claim 1, further comprising:
a turbo-charger for the engine intake air powered by a turbine configured to be driven by the exhaust in the leading conduit
wherein a second of the branches contains a fuel reformer and a NOx adsorber-catalyst, the fuel reformer being configure upstream of the NOx adsorber-catalyst.

18. The exhaust aftertreatment system of claim 1, further comprising:
an EGR system for the engine configured to recirculate exhaust from the leading conduit;
wherein a second of the branches contains a fuel reformer and a NOx adsorber-catalyst, the fuel reformer being configure upstream of the NOx adsorber-catalyst.

19. The exhaust aftertreatment system of claim 1, further comprising a lean-NOx catalyst selected from the group consisting of hydrocarbon-SCR catalysts, carbon monoxide-SCR catalysts, and hydrogen-SCR catalysts within the trailing conduit.

20. The exhaust aftertreatment system of claim 1, further comprising a lean-NOx catalyst selected from the group consisting of hydrocarbon-SCR catalysts, carbon monoxide-SCR catalysts, and hydrogen-SCR catalysts configured within the conduit containing the NOx adsorber-catalyst.

21. The exhaust aftertreatment system of claim 20, further comprising:
a fuel reformer configured within the branch containing the NOx adsorber-catalyst, upstream of the NOx adsorber-catalyst;
a fuel injector configured within the branch containing the NOx adsorber-catalyst, upstream of the fuel reformer;
wherein the lean-NOx catalyst is a hydrogen-SCR catalyst configured upstream of the fuel reformer but downstream of the fuel injector.

22. A power generation system comprising:
an engine operable to produce an exhaust; and
an exhaust aftertreatment system according to claim 1 configured to treat the exhaust.

23. A vehicle comprising the power generation system of claim 22.

24. A method of treating engine exhaust, comprising:
channeling the exhaust through a leading exhaust conduit;
splitting the exhaust from the leading exhaust conduit into two or more branches at least one branch containing a NOx adsorber-catalyst; and
from time-to-time, regenerating the NOx adsorber-catalyst by injecting reductant into the NOx adsorber-catalyst's corresponding branch upstream of the NOx adsorber-catalyst;
wherein the exhaust flow is allowed to divide between the branches only according to factors consisting essentially of factors selected from the group consisting of the temperature-dependent friction factors attributable to the fixed geometries of the branches including the devices they contain, the effects of reductant and exhaust flows in the branches, and temperature actuated dampers.

25. The method of claim 24, wherein the exhaust flow distribution between the branches is not altered during or between regenerations except, optionally, by the action of heat, reductant flow, or chemical reaction.

26. The method of claim 24, wherein the exhaust flow is allowed to divide between the branches during the regenerations without diversion by any electronically controlled exhaust valves or dampers or secondary air jets.

27. The method of claim 24, wherein the two or more branches rejoin downstream of the NOx adsorber-catalyst to recombine the exhaust flow and the recombined exhaust flow is channeled through a SCR catalyst.

28. The method of claim 27, wherein two or more of the branches contain NOx adsorber-catalysts.

29. The method of claim 24, wherein the fraction of the exhaust entering each branch varies by no more than about 20% between times one or the NOx adsorber-catalyst is being regenerated and times it is not.

30. The method of claim 24, wherein:
a reformer is configured within the branch containing the NOx adsorber-catalyst; and
regenerating comprises heating the reformer and supplying the reformer with diesel fuel that is reformed by the reformer to produce reformate, which regenerates the NOx adsorber-catalyst.

31. The method of claim 30, further comprising cooling the exhaust by at least about 100° C. between the reformer and the downstream NOx adsorber by heat exchange between branches.

32. The method of claim 28, further comprising desulfating each NOx adsorber-catalyst from time-to-time, wherein desulfation comprises operating reformers for two or more branches simultaneously.

33. A method of operating a NOx adsorber-catalyst in one of the branches of an exhaust aftertreatment system having two or more branches each branch containing an in-line reformer upstream of a NOx adsorber-catalyst, the two or more branches separating upstream of the reformers and rejoining downstream of the NOx adsorber-catalysts, comprising:
allowing a first portion of the exhaust to flow into the one branch and a second portion of the exhaust to simultaneously flow into a second branch;
adsorbing NOx from the exhaust in the one branch using the NOx-adsorber-catalyst in the one branch during a lean phase;
injecting a fuel into the one branch to begin a reformer warming phase;
combusting the fuel in the reformer in the one branch to warm the reformer;
increasing the fuel flow rate to initiate a rich phase;
regenerating the NOx adsorber-catalyst in the one branch; and
terminating the fuel flow to begin a new lean phase;
wherein the average proportion of the exhaust flowing into the one branch during the rich phase is at least about 50% of the average proportion of the exhaust flowing into that branch during the lean phase.

34. The method of claim 33, wherein the average proportion of the exhaust flowing into the one branch during the rich phase is at least about 80% of the average proportion of the exhaust flowing into that branch during the lean phase.

* * * * *